United States Patent
Pulliam et al.

(10) Patent No.: US 10,065,467 B2
(45) Date of Patent: Sep. 4, 2018

(54) BALL HITCH FIFTH WHEEL

(71) Applicant: Pulliam Enterprises, Inc., Mishawaka, IN (US)

(72) Inventors: Randall A Pulliam, Mishawaka, IN (US); William A Aske, Union, MI (US); Kurt E. McKesson, Niles, MI (US); James M. Karasch, Elkhart, IN (US)

(*) Notice: Subject to any disclaimer, the term of this patent is extended or adjusted under 35 U.S.C. 154(b) by 0 days.

(21) Appl. No.: 15/205,508

(22) Filed: Jul. 8, 2016

(65) Prior Publication Data
US 2017/0008358 A1 Jan. 12, 2017

Related U.S. Application Data

(60) Provisional application No. 62/190,040, filed on Jul. 8, 2015.

(51) Int. Cl.
| B60D 1/46 | (2006.01) |
| B60D 1/48 | (2006.01) |
| B60D 1/52 | (2006.01) |
| B60D 1/50 | (2006.01) |
| B60D 1/06 | (2006.01) |

(52) U.S. Cl.
CPC ............... B60D 1/488 (2013.01); B60D 1/46 (2013.01); B60D 1/50 (2013.01); B60D 1/52 (2013.01); B60D 1/065 (2013.01)

(58) Field of Classification Search
CPC . B60D 1/488; B60D 1/46; B60D 1/50; B60D 1/52; B60D 1/065
See application file for complete search history.

(56) References Cited

U.S. PATENT DOCUMENTS

| 3,527,476 | A | * | 9/1970 | Winckler | B62D 53/0828 |
| | | | | | 280/423.1 |
| 3,650,546 | A | * | 3/1972 | Koenig | B60D 1/065 |
| | | | | | 280/423.1 |
| 5,868,415 | A | * | 2/1999 | Van Vleet | B60D 1/065 |
| | | | | | 280/483 |
| 6,050,588 | A | * | 4/2000 | Kissack | B60D 1/06 |
| | | | | | 280/434 |
| 6,234,509 | B1 | * | 5/2001 | Lara | B60D 1/06 |
| | | | | | 280/425.2 |
| 6,540,246 | B2 | * | 4/2003 | Andersen | B60D 1/06 |
| | | | | | 280/439 |
| 6,776,431 | B1 | * | 8/2004 | Dick | B60D 1/065 |
| | | | | | 280/416.1 |

(Continued)

*Primary Examiner* — Kevin Hurley
*Assistant Examiner* — Marlon A Arce
(74) *Attorney, Agent, or Firm* — Botkin & Hall, LLP

(57) ABSTRACT

A fifth wheel hitch adapted for receiving a hitch ball. The fifth wheel hitch has a frame that is mountable to a towing vehicle surface. The frame has an outer sleeve that is fixed with respect to the frame and a receiver is telescopingly received inside the outer sleeve. The receiver is moveable longitudinally with respect to the outer sleeve. The receiver has an upper end, a lower end, and a support wall within the receiver that is located between the upper and lower ends. The receiver is selectively lockable with respect to the outer sleeve. The selective locking is done with a combination of a pin driven through aligned holes in the outer sleeve and receiver and threaded fasteners drive through the outer that impinge on the receiver to prevent rattling.

11 Claims, 8 Drawing Sheets

(56) References Cited

U.S. PATENT DOCUMENTS

| | | | | |
|---|---|---|---|---|
| 7,878,525 B2* | 2/2011 | Andersen | ............... | B60D 1/065 |
| | | | | 280/416.1 |
| 8,523,217 B2* | 9/2013 | Andersen | ................. | B60D 1/06 |
| | | | | 280/504 |
| 2015/0217608 A1* | 8/2015 | Rabska | ................. | B60D 1/065 |
| | | | | 280/441.2 |

* cited by examiner

BALL HITCH FIFTH WHEEL

BACKGROUND OF THE INVENTION

Traditional king pin and fifth wheel hitches used on recreational vehicles are similar to those used on tractor trailer combinations and have the same disadvantages. The king pin must be at a very specific height for its entry into the fifth wheel hitch. The operator of the vehicle must back into the king pin when it is at its proper height. Performing this task can be nearly impossible in locations other than a large, level, and flat surface.

Another problem with traditional king pin and fifth wheel hitches is the constraint of the trailer to rotate in a single plane. In a traditional fifth wheel hitch, the pin is locked with a jaw that restrictively limits the out of plane movement with respect to the hitch. While this may work for a tractor trailer combination, it is extremely undesirable for smaller vehicles. Traveling over uneven terrain will necessitate out of plane movement. A previous attempt to provide out of plane movement with a fifth wheel hitch has been to provide a pivot pin below the fifth wheel plate. This is done to provide a gimbaled connection and this allows the entire fifth wheel plate to pivot, but adds significant weight and complexity to the hitch.

An additional problem of traditional fifth wheel hitches and other hitches is difficulty in determining whether a secure connection has been made. The locking parts within a traditional fifth wheel hitch are not visible when the hitch is properly connected. As such, an user of such a hitch is required to test the connection before traveling. If this is not done, the user runs the risk of dropping the trailer. This unsafe situation can damage the towing vehicle as well as other vehicles near the towing vehicle. A more flexible system that provides assurance a proper connection has been made is needed for an ordinary recreational user that may lack the requisite skill to align a king pin in a fifth wheel hitch.

SUMMARY OF THE INVENTION

The present invention is for a fifth wheel hitch that is useful for receiving a coupler that may be in the shape of a ball. The fifth wheel hitch has a frame that is mountable to a vehicle surface. The frame includes an outer sleeve that is fixed with respect to the frame. A receiver tube is telescopingly received inside the outer sleeve and moveable longitudinally with respect to the outer sleeve. The receiver tube has an upper end, a lower end, and a support wall within the receiver tube that is located between the upper and lower ends. The receiver tube is selectively lockable with respect to the outer sleeve.

Additionally, the outer sleeve may include a fastener driven through it that is adapted for impinging on the receiver tube. The receiver tube and outer sleeve may both have apertures through them that are alignable and adapted for receiving a pin to lock the receiver with respect to the outer sleeve. Further, a catch pin may be retractably located in the receiving tube so that in a first position it acts to restrain a hitch ball placed within the receiver, and in a second withdrawn position, the hitch ball is free to be removed from the receiver.

DETAILED DESCRIPTION OF INVENTION

Figure 1:
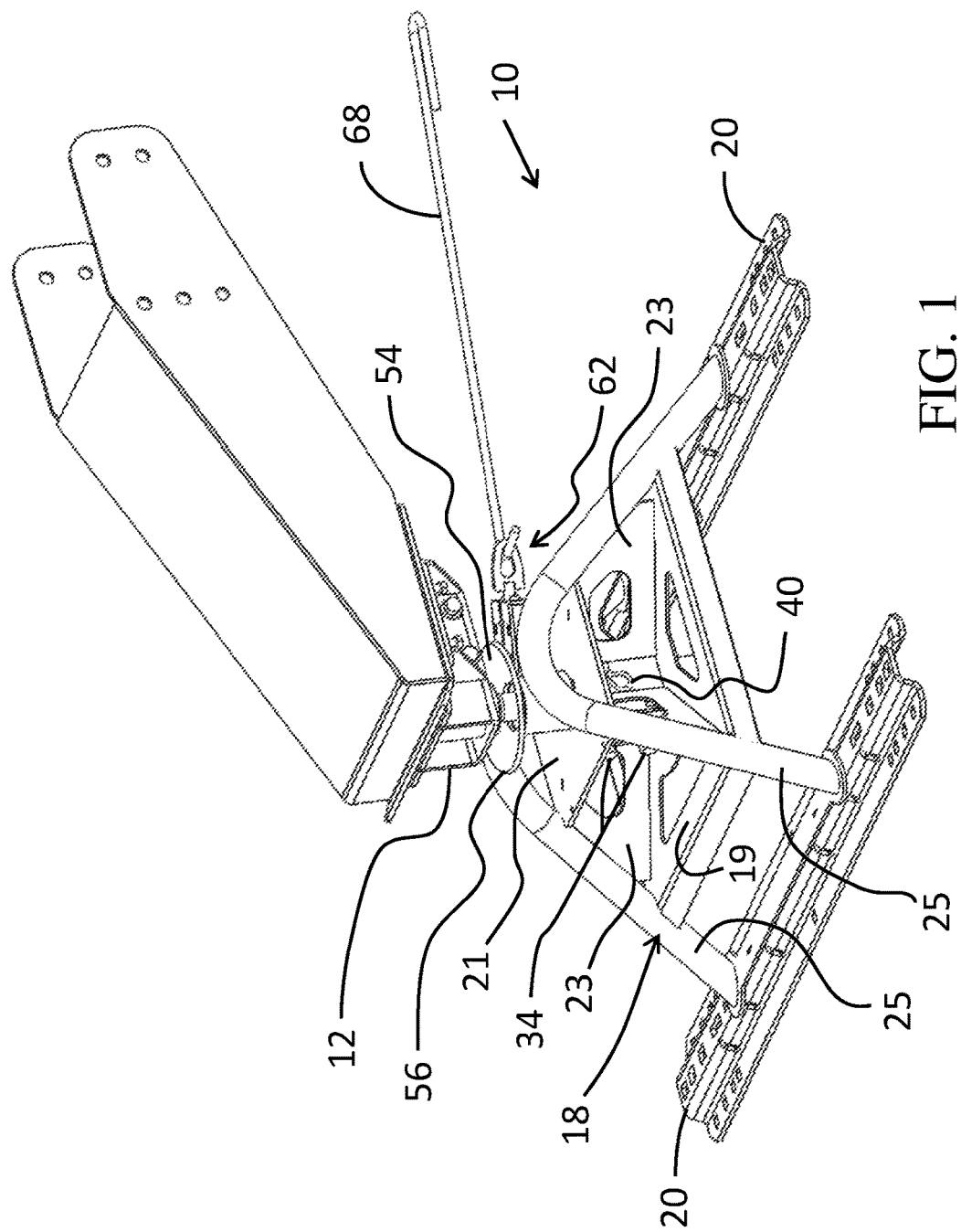
FIG. 1 is a perspective view of the fifth wheel hitch.

FIG. 1 shows a view of the fifth wheel hitch 10 of the present invention as it is used with a pin box 12 of a mating trailer. The trailer is not shown but may be a recreational vehicle or other trailer that would be towed using a fifth wheel in a pickup truck or other towing vehicle capable of supporting a fifth wheel hitch. For the purposes of this description hereinafter, a pickup truck will be considered the towing vehicle.

Figure 2:
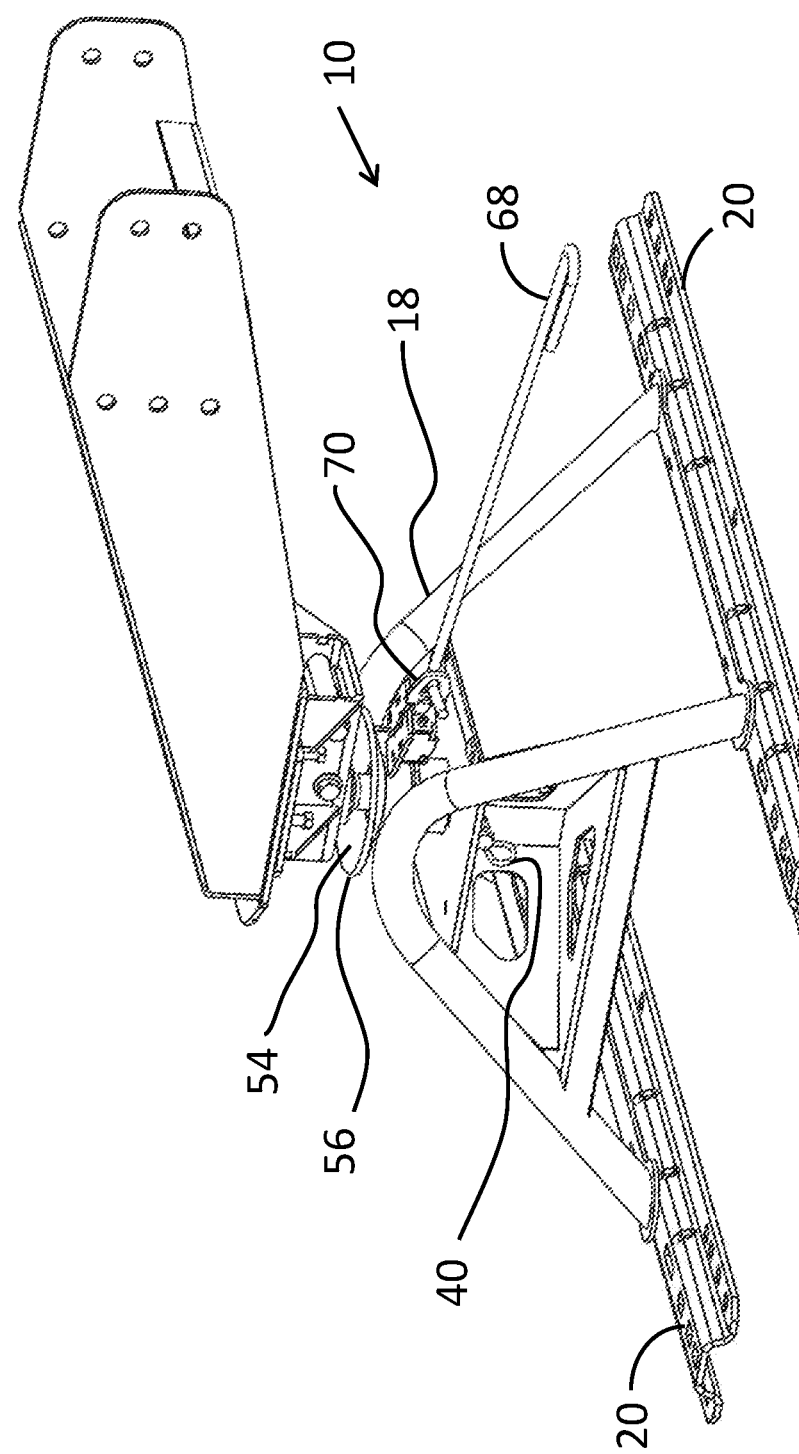
FIG. 2 is another perspective view of the fifth wheel hitch shown in FIG. 1.
Figure 3:
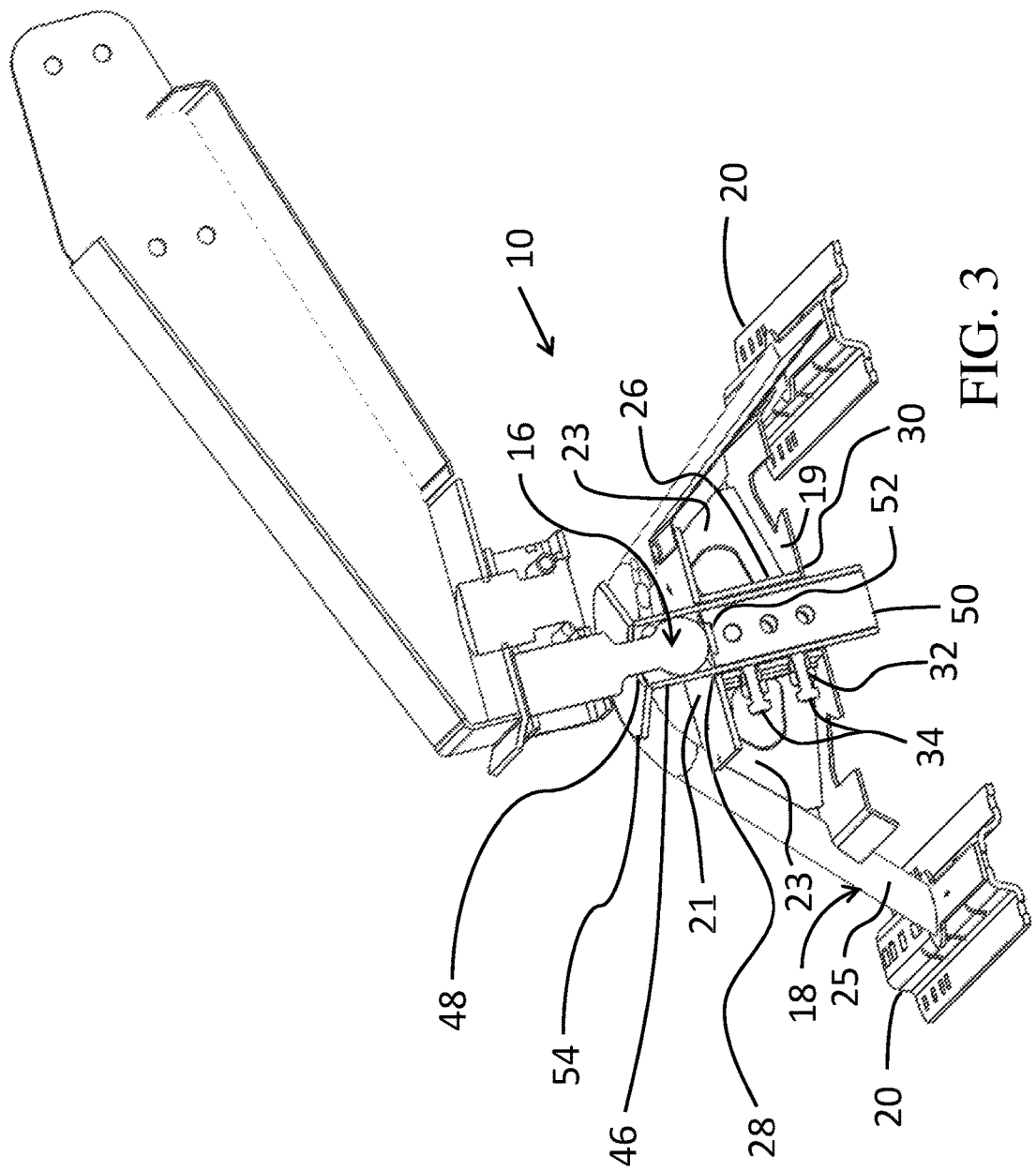
FIG. 3 is a sectional view of the fifth wheel hitch shown in FIGS. 1 and 2 taken about the centerline of the hitch ball.
Figure 4:
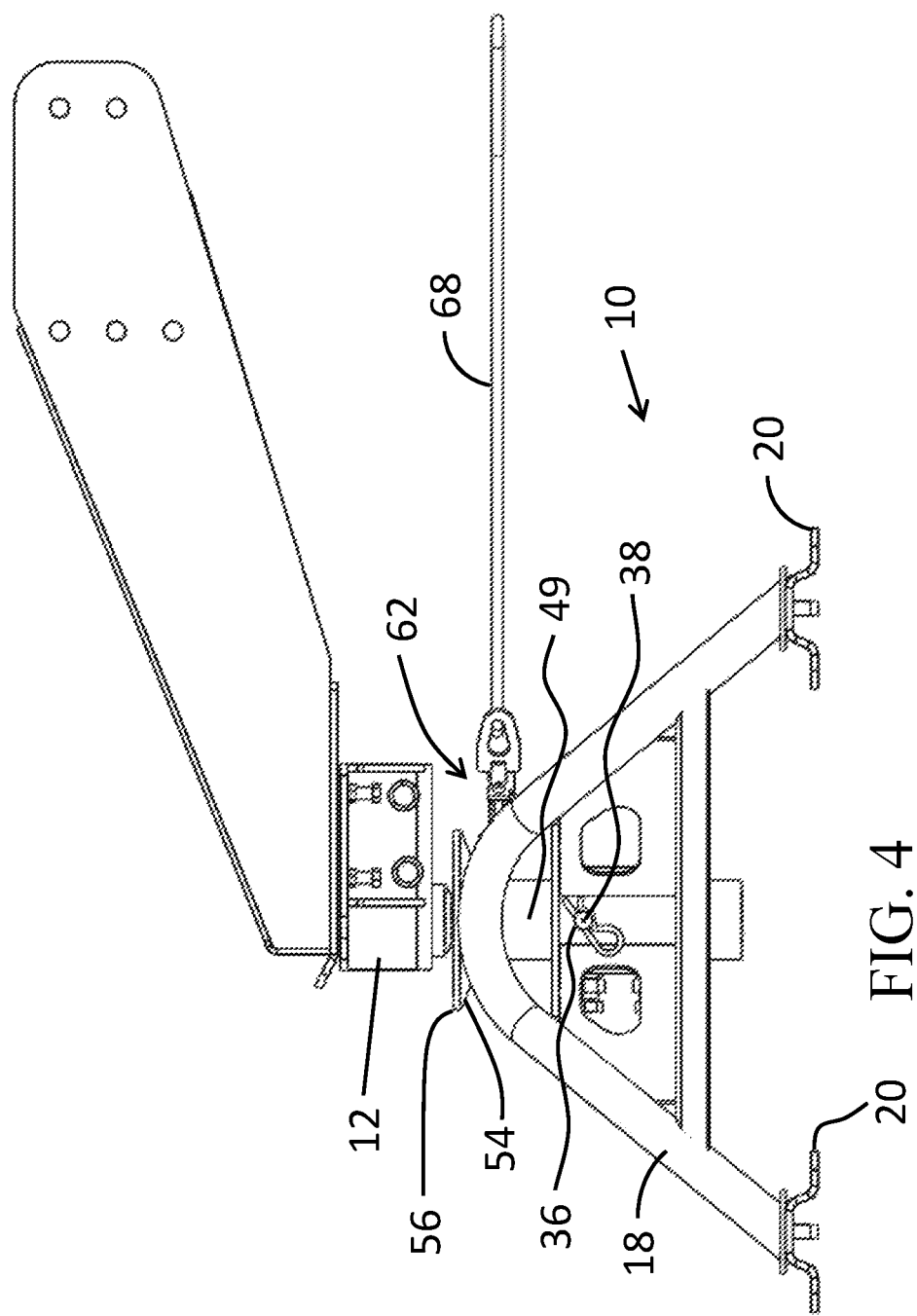
FIG. 4 is a side view of the fifth wheel hitch shown in FIGS. 1-3.

The fifth wheel hitch 10 of the present invention is used with a hitch ball 16 that extends downwardly from the pin box 12. A hitch ball 16 is shown, but it is not absolutely necessary that the hitch ball 16 that acts as a coupling member be a complete ball. Production of a ball is a simple way to achieve the goals of this invention and provides rounded contact surfaces that assist the function of the invention. It is possible that the coupling member, which is shown as a hitch ball 16 in the figures, be a non-spherical shape or a partially spherical shape. Having the lowermost portion of the hitch ball 16 as a spherical shape is generally advantageous to facilitate smooth movement. The hitch ball 16, or more generally hitch 16, is best seen in FIG. 3. The hitch 16 provides multiple degrees of freedom for rotation when it is connected to the fifth wheel hitch 10. The fifth wheel hitch 10 has a frame 18 that is adapted to be mounted into the bed of a pickup truck. The frame 18 shown in FIGS. 1-3 has horizontal bed rails 20 that are mounted to the bed. However, the frame 18 may be of the type that has downwardly extending mounting lugs that are adapted to mate with the pickup manufacturers' sockets that may be provided as original equipment or as aftermarket accessories. The frame 18 shown in FIGS. 1-3 or one using lugs will work well with the concept of the present invention.

Figure 5:
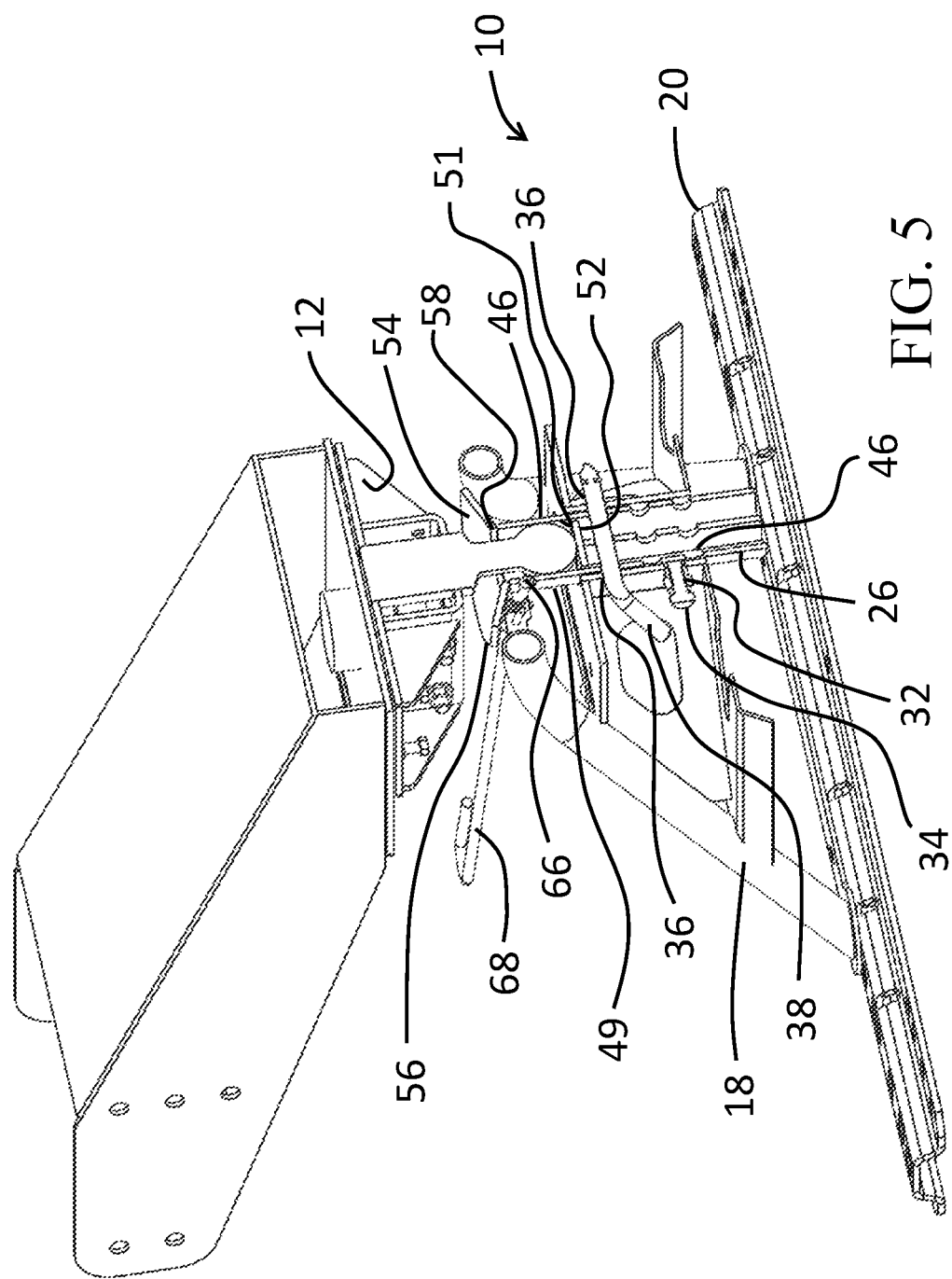
FIG. 5 is a perspective view of the fifth wheel hitch taken perpendicularly to that of FIG. 2 through the center of the hitch ball.

The frame 18 includes an outer sleeve 26 that is welded within the frame 18. The outer sleeve 26 includes an upper end 28 and a lower end 30. The frame 18 includes a lower planar wall 19 and an upper planar wall 21 where the outer sleeve 26 is affixed. Located between the lower and upper planar walls 21,19 are vertical walls 23. The frame further includes bent tubular members 25 where the walls 19,21,23 are affixed. The outer sleeve 26 is affixed to the vertical walls 23 to provide additional rigidity. The outer sleeve 26 also includes threaded holes 32 that are best shown in FIG. 5. The threaded holes 32 include bolts 34 that extend into the outer sleeve 26. The outer sleeve 26 includes a series of transverse holes 36 at various vertical heights that are perpendicular to the threaded holes 32. These transverse holes 36 are adapted to receive a pin 38 that extends through the outer sleeve 26. The pin 38 is bent downwardly at one end and cannot be passed through its corresponding hole 36. The opposite end of the pin 38 receives a cotter pin 40 that holds the pin in the transverse holes 36 on an opposite side of the outer sleeve 26. It is contemplated that the cotter pin 40 could be replaced an E-clip, snap ring, or other mechanical fastening device. A receiver tube 46 is slidingly and telescopically received in the outer sleeve 26. The outer sleeve 26 is coaxially aligned with receiver tube 46 shown in FIG. 3. The receiver tube 46 has an upper end 48 and a lower end 50. The receiver tube 46 is defined by a continuous sidewall 47 having an outer surface 49 and an inner surface 51. The receiver tube 46 is shown as a cylindrical cross section, but it is contemplated that the receiver tube 46 could be a rectangular or other enclosed polygon shape. A support wall 52 is located near the upper end 48 of the receiver tube 46. The support wall 52 is welded into the receiver tube 46 and is adapted for supporting the weight of the hitch ball 16. A receiver pocket 53 is defined by the inner surface 51 of the receiver tube 46, the upper end 48 and the support wall 52. The support wall 52 is adjustable with respect to the outer sleeve 26 and may be adjusted to a height that locates the support wall 52 within the outer sleeve 26. The receiver tube 46 has a funnel 54 located at its upper end 48. The funnel 54 has an upper edge 56 that defines its outer diameter and the funnel 54 has an inner diameter 58 that is concentrically aligned with the receiver tube 46 inner surface 51 that defines the inner diameter of the receiver tube 46. The funnel 54 extends well outwardly of the outer surface 49 of the receiver tube 46. As such, the funnel 54 is cantilevered with respect to the receiver tube 46. It is possible that gussets may be added to support the funnel 54, but is generally not necessary if a thick enough material is chosen to make the funnel 54. The funnel 54 is adapted to guide the hitch ball 16 into the receiver tube 46. The receiver tube 46 has a series of transverse holes 61 that are selectively alignable with the holes 36 in the outer sleeve 26. When the holes 61 in the receiver tube 46 are aligned with the holes 36 in the outer sleeve 26, pin 38 may be inserted through the aligned holes 61, 36 to selectively lock the vertical position of the receiver tube 46 with respect to the outer sleeve 26 and frame 18.

Figure 6:
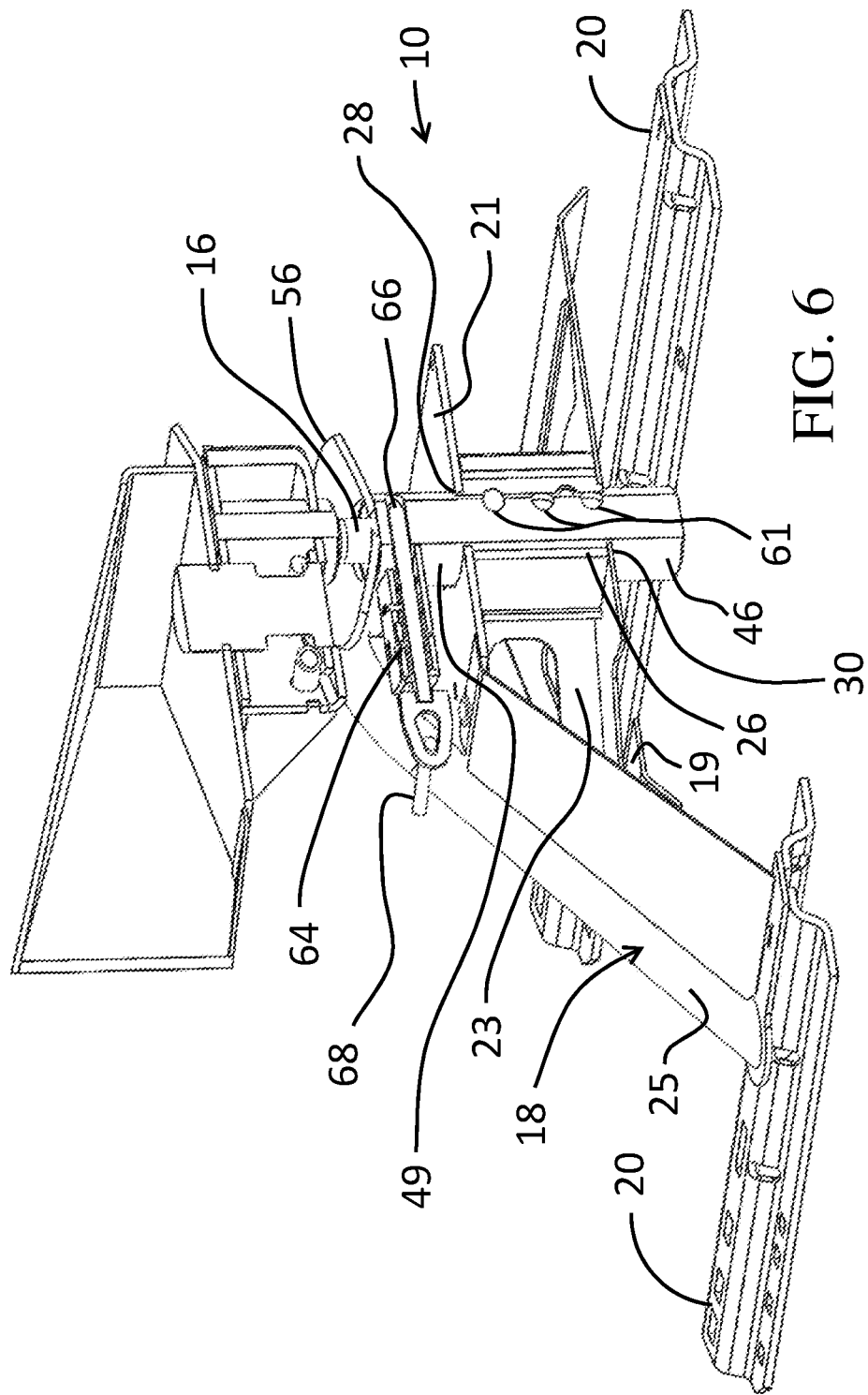
FIG. 6 is sectional view of the fifth wheel hitch taken through the center of a spring loaded locking pin.
Figure 7:
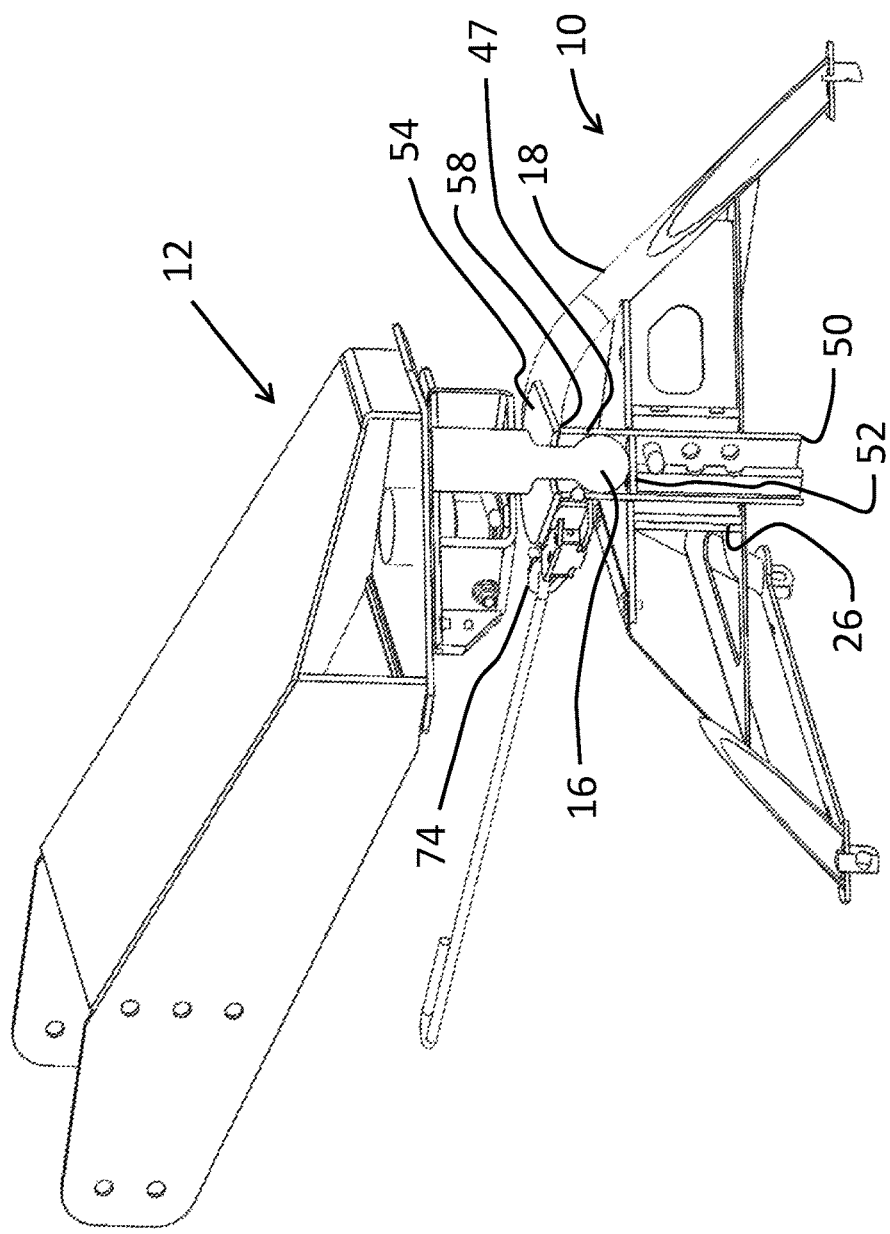
FIG. 7 is a sectional view of an embodiment of a locking mechanism that uses a non-spring pin for locking.
Figure 8:
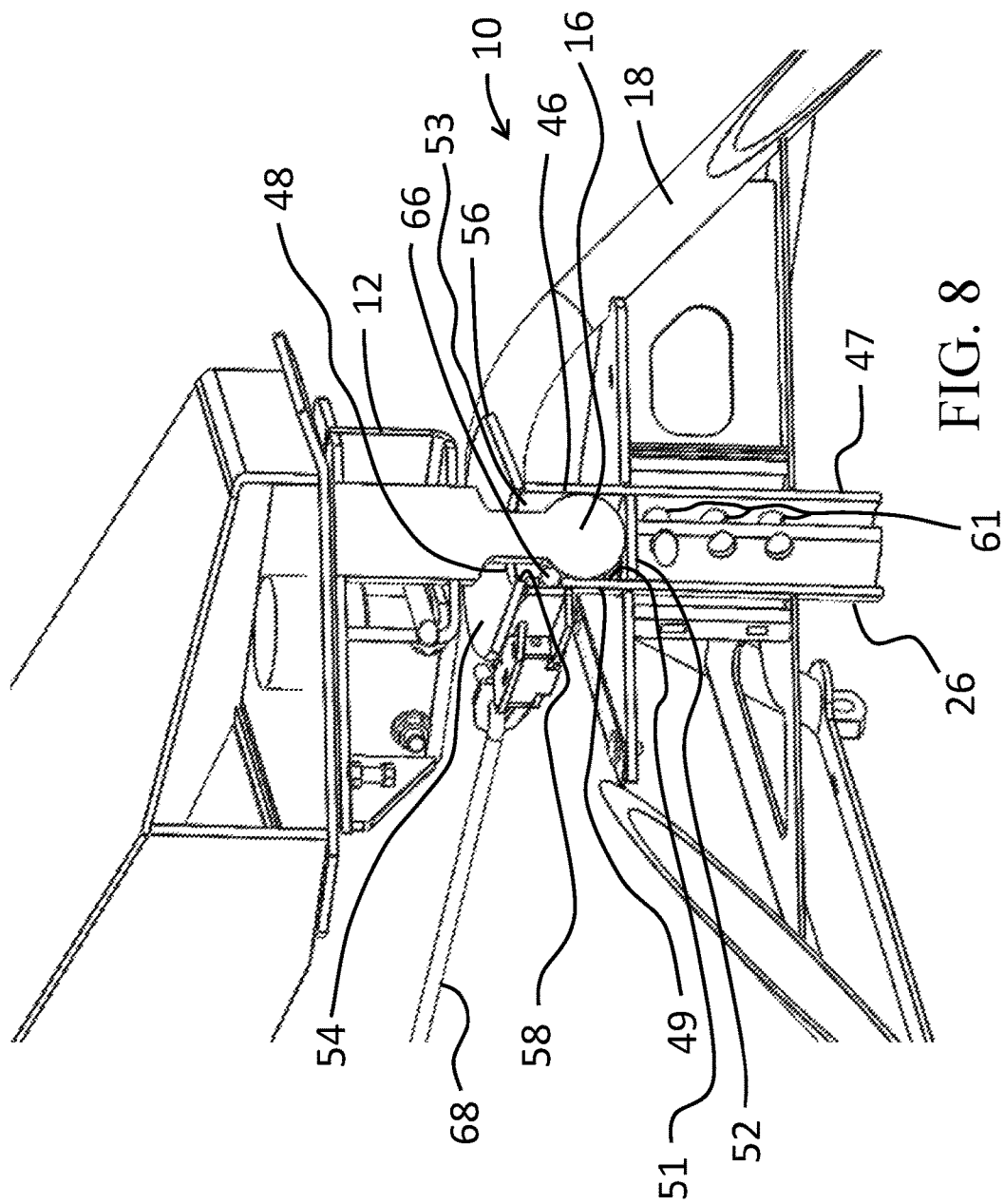
FIG. 8 is a magnified view of the sectional view shown in FIG. 7.

A locking mechanism 62 located on the receiver tube 46. The locking mechanism 62 near the upper end 28 of the receiver tube 46 is adapted to retain the hitch ball 16 within the receiver tube 46. The pin 66 is chordally located with respect to the center of the diameter of the receiver tube 46. In other words, the pin 66 is offset from the center of the receiver tube 46. The side of the pin 66 is adapted to prevent upward movement of the hitch ball 16 from the receiver tube 46 as can be seen in FIG. 6. A first position is shown in FIG. 6 and corresponds to a locking position that acts to retain the hitch ball 16 in the receiver tube. The pin 66 is movable away from the receiver tube 46 so that the pin is retracted from the receiver tube 46, and this corresponds to a second and unlocked position of the pin 66 that allows removal of the hitch ball 16 from the receiver tube 46. The pin 66 may be retracted by a pull rod 68 that is inserted into loop 70 of the pin 66 and pulled away from the receiver tube 46. The pin 66 serves to lock the hitch ball 16 within the receiver tube 46 when the pin 66 is in its first position.

A user of the fifth wheel hitch 10 will first determine the height above the truck bed that is desired and set the height of the receiver tube 46 with respect to the frame 18. This is done by removing the pin 38 from the outer sleeve 26 and the receiver tube 46. Holes in the receiver tube 61 and outer sleeve 36 are aligned at the desired height and the pin 38 is inserted through the aligned holes 61, 36. The cotter pin 40 or other mechanical locking device is then snapped into the pin 38 to prevent it from being dislodged from the holes 61, 36. To further lock the receiver tube 46, bolts 34 are tightened against the receiver tube 46. This not only locks the receiver tube 46 with respect to the outer sleeve 26 but serves to prevent rattling of the receiver tube 46. The rattling would be felt by a driver of the towing vehicle and the bolts 34 provide a more responsive connection during towing. With the receiver tube 46 set at the proper height, the driver of the towing vehicle will back the vehicle, to which the fifth wheel hitch 10 is attached, underneath the hitch ball 16 of the trailer to be towed. It is not critical that the hitch ball 16 on the trailer be in the same plane as the receiver tube 46. When the receiver tube 46 is near the hitch ball 16 the driver will stop the vehicle and lower the hitch ball 16 into the receiver tube 46. The funnel 54 assists in this effort because the hitch ball 16 need only be near the receiver tube 46 and the hitch ball 16 will be guided into the receiver tube 46. The user of the fifth wheel hitch 10 knows with absolute certainty that a secure connection is made to the hitch ball 16 because he can see the receiver tube 46 and the hitch ball 16 as they connect and the receiver tube 46 completely circumscribes the hitch ball 16. The pin 66 of locking mechanism 62 must be moved into the second position (withdrawn from the receiver tube 46), which will allow the hitch ball 16 to rest on the support wall 52. The pin 66 will be biased into its first, locked position by spring 64. The biasing spring 64 will serve as an effective mechanism to prevent the pin 66 from retracting.

The invention is not limited to the description above but may be modified within the scope of the following claims.

What is claimed is:
1. A fifth wheel hitch adapted to be affixed to a towing vehicle, said hitch comprising:
   a pair of bed rails adapted to be affixed to said towing vehicle
   a frame adapted to be affixed to said bed rails to affix said frame to said towing vehicle and including a cylindrical outer sleeve fixed with respect to said frame and centrally located between said bed rails, said frame having a lower planar wall affixed thereto and an upper planar wall affixed thereto and parallel to said lower planar wall, said outer sleeve affixed to said lower planar wall at a lower end, said outer sleeve affixed to said upper planar wall at an upper end, said outer sleeve having transverse holes extending therethrough and located between said upper and lower planar walls;
   a receiver including a cylindrical hitch receiving pocket, said receiver being telescopingly received inside said cylindrical outer sleeve and axially moveable with respect to said outer sleeve, said receiver having an upper end facing away from said frame, a lower end and including a support wall within said receiver located intermediate to said upper and lower ends, said hitch receiving pocket defined by said upper end of said receiver, an inner surface of said receiver, and said support wall, said hitch receiving pocket adapted for receiving a hitch and said support wall adapted for supporting said hitch, said receiver having transverse holes located between said lower end and said support wall, said receiver being selectively lockable with respect to said outer sleeve when said transverse holes of said outer sleeve are aligned with said transverse holes of said receiver and receiving a pin; and
   said outer sleeve having two threaded apertures extending therethrough to receive corresponding fasteners, said fasteners adapted to impinge said receiver.

2. The fifth wheel hitch of claim 1, further comprising a hitch ball adapted to be affixed to a trailer, said hitch ball received by and constrained by said hitch receiving pocket.

3. The fifth wheel hitch of claim 1, wherein said upper end of said receiver includes a funnel adapted for guiding a mating ball into said receiver.

4. The fifth wheel hitch of claim 1, including catch pin movable between a first position extending into said receiver and second position wherein said pin is withdrawn from said receiver.

5. The fifth wheel hitch of claim 4, said pin being biased into said first position by a spring.

6. The fifth wheel hitch of claim 4, wherein said upper end of said receiver includes a funnel adapted for guiding a mating ball into said receiver.

7. The fifth wheel hitch of claim 6, including a threaded fastener driven through said outer sleeve adapted for impinging on said receiver.

8. A fifth wheel hitch adapted to be affixed to a towing vehicle, said towing vehicle having bed-mounted rails, said hitch comprising:
 a frame mountable to said bed-mounted rails on said towing vehicle and including a cylindrical outer sleeve affixed to an upper planar wall and a lower planar wall, each said wall affixed to said frame, said frame including vertical walls affixed to bent tubular members on said frame, said upper planar wall, and said lower planar wall, said outer sleeve including an aperture extending transversely therethrough and said outer sleeve including a threaded fastener driven through said outer sleeve;
 a cylindrical receiver including a hitch receiving pocket, and an aperture extending transversely therethrough, said receiver being telescopingly received inside said outer sleeve and moveable axially with respect to said outer sleeve, said receiver having an upper end, a lower end and including a support wall within said receiver located intermediate to said upper and lower ends, said hitch receiving pocket defined by said upper end of said receiver, an inner surface of said receiver, and said support wall, said apertures in said receiver and said outer sleeve being alignable and adapted for receiving a pin extending through said apertures when said apertures are aligned, said threaded fastener adapted for impinging on said receiver, said hitch receiving pocket facing upwardly away from said frame and adapted for receiving a hitch ball and said support wall adapted for supporting said hitch ball, said receiver being selectively lockable with respect to said outer sleeve.

9. The fifth wheel hitch of claim 8, including catch pin movable between a first position extending into said receiver and second position wherein said catch pin is withdrawn from said receiver.

10. The fifth wheel hitch of claim 9, said catch pin being biased by a spring into said first position.

11. The fifth wheel hitch of claim 10, said catch pin being chordally located with respect to a diameter of said receiver.

\* \* \* \* \*